United States Patent [19]

Sander

[11] Patent Number: 4,759,969

[45] Date of Patent: Jul. 26, 1988

[54] METHOD OF MANUFACTURE OF FOIL MATERIAL AND THE FOIL MATERIAL MADE THEREBY

[75] Inventor: Helfried Sander, Nuremberg, Fed. Rep. of Germany

[73] Assignee: Messrs. Leonhard Kurz GmbH & Co., Furth, Fed. Rep. of Germany

[21] Appl. No.: 925,312

[22] Filed: Oct. 31, 1986

Related U.S. Application Data

[62] Division of Ser. No. 751,374, Jul. 2, 1983, abandoned.

[30] Foreign Application Priority Data

Aug. 16, 1984 [DE] Fed. Rep. of Germany ....... 3430111

[51] Int. Cl.$^4$ .......................... B32B 3/10; B32B 7/00; B05D 3/10; B05D 5/00

[52] U.S. Cl. .................................... 428/209; 427/148; 427/264; 427/270; 428/202; 428/914

[58] Field of Search ....................... 427/148, 264, 270; 428/209, 914, 202, 203

[56] References Cited

U.S. PATENT DOCUMENTS

| | | | |
|---|---|---|---|
| 4,012,552 | 3/1977 | Watts | 428/200 |
| 4,477,312 | 10/1984 | Czichy | 427/264 X |
| 4,495,232 | 1/1985 | Bauser et al. | 428/41 |
| 4,687,680 | 8/1987 | Narui et al. | 427/38 |

*Primary Examiner*—Evan K. Lawrence
*Attorney, Agent, or Firm*—Louis E. Marn

[57] ABSTRACT

A method of manufacturing a foil material having a metal layer on a region thereof comprises applying to a backing foil a layer of a soluble material such as a lacquer to which a hardening agent is then applied in selected regions thereof, the hardening agent reacting with the soluble material to cause it to harden. A coating of metal is then applied over the layer of soluble material and the portions of the layer of soluble material which have remained soluble are then removed, thereby also removing the portions of the layer of metal thereon and leaving the metal on the hardened portions of the layer of soluble material. The foil material made by the method is also disclosed.

12 Claims, 1 Drawing Sheet

METHOD OF MANUFACTURE OF FOIL MATERIAL AND THE FOIL MATERIAL MADE THEREBY

This is a division, of application Ser. No. 751,374, filed July 2, 1985, now abandoned.

BACKGROUND OF THE INVENTION

In regard to various kinds of foils, for example hot embossing foils which are used for decorative purposes but also for example packaging foils and the like, there is from time to time a desire for the foil to be provided with a metal coating thereon, only in specified regions or areas thereof, for example to define a pattern on the foil so that for example lettering, pictures and other forms of graphics can be produced on the foil, which have a metal effect or appearance. When dealing with foils of the above-indicated kind, the operation of applying the metal coating to the surface thereof is usually effected by a vapour deposit operation or a similar kind of process, over the entire area of the foil. In the past therefore, for that reason, when a coating of metal is required on the foil only over a given region thereof, the mode of operation may be such that the layer of metal on the foil is suitably covered over, for example by printing over the parts of the metal layer which are not to be visible as such, so that the metal layer can be seen only in the required areas in which the metal has not been covered. When using that mode of procedure however, there is the risk that the layer which covers over the metal coating on the foil may become worn away in use of the foil, so that the underlying metal can then be seen. Another possible mode of operation is for the layer of metal, after having been applied to the foil, to be covered in the appropriate regions thereof with a lacquer which is not attacked by certain etching agents which, on the contrary, will attack the layer of metal, with the metal layer then being etched away in the regions thereof which are not covered by the etch-resistant layer, whereupon the etch-resistant layer has to be washed away in order to expose the areas of metal which still remain on the foil in the appropriate configuration. It will be appreciated that such a procedure is complicated and in some cases may also give rise to quite serious environmental pollution by virtue of using solvents which give off etching vapours and in most cases solvent vapours also.

In regard to the production of hot-process embossing foils, one mode of operation which has previously been employed provides that the carrier or backing foil which is optionally provided with a layer of protective lacquer thereon, is provided with a coating of lacquer, for example by a printing process, in the areas of the carrier or backing foil in which no coating of metal is to appear. The layer of lacquer applied to the backing foil can be dissolved away by means of a solvent that does not attack the backing foil or the above-mentioned coating of protective lacquer that is optionally applied thereto. When the lacquer has been applied to the areas on the backing foil in which no metal is to be deposited, metal is applied to the backing foil by a vapour deposit operation. Then, the layer of metal is removed again in the areas of the backing foil in which no metal coating is required thereon, by dissolving the soluble lacquer. A process of that kind enjoys more particularly the advantage that it is possible to produce extremely fine and delicate patterning effects because the operation of applying the soluble lacquer to the backing foil by a printing operation can be performed virtually as desired, to give the required effects.

However, that process suffers from the disadvantage that the surface which is to be coated with metal is generally relatively uneven, which results in metal coatings of differing thicknesses, which in turn can have disadvantageous effects on the finished product, that is to say, the article resulting after partial selective removal of the coating of metal by the step of dissolving away the soluble layer. However, the above-indicated process also suffers from the particular advantage that it is virtually impossible to produce colour effects in regard to the metal layer. In order to produce the impression of a coloured metal coating, it is necessary for the layer of metal to be covered on the visible side thereof with a transparent, coloured coating of lacquer. If now that transparent, coloured coating of lacquer is applied between the soluble lacquer and the backing foil, it is not also removed together with the portions of the metal coating which are to be removed, so that it is not just the metal coating but also the background areas that are correspondingly coloured, and that is unacceptable in many cases. In such situations, it would then be necessary for the transparently coloured layer of lacquer to be applied only after the soluble coating of lacquer has been formed. In that case however, serious complications arise in the operation of dissolving away the soluble lacquer because, before the solvent can act on the soluble lacquer, it first has to penetrate through the coating of transparent lacquer. The only remaining possibility finally in regard to the known process is for the coating of metal to be coloured by staining by means of a highly viscous agent. As however such an agent would have to be applied before the coating of metal is formed on the backing foil or a coating of cover lacquer where provided, there is the risk that the staining effect on the coating of metal that is subsequently produced is not very strong, and in particular it is only possible to produce a really weak colouration effect.

SUMMARY OF THE INVENTION

An object of the invention is to provide a foil such as a hot embossing foil, which can give a desired form of metal patterning thereon.

Another object of the invention is to provide a foil having a coating of metal thereon, of substantially uniform colouration.

Still another object of the invention is to provide a foil having a coating of metal thereon, which can be produced as a pattern with a substantial degree of fineness.

A further object of the invention is to provide a method of producing a foil such as a hot embossing foil, which does not suffer from the disadvantages of the previous methods discussed above.

A still further object of the invention is to provide a method of producing a foil with a metal coating thereon which can be in the form of a controlled configuration with a substantial degree of fineness.

A yet further object of the present invention is to provide a method of producing a foil having a coating of metal thereon, which can be at least substantially uniformly coloured.

Those objects are achieved in a foil such as a hot embossing foil which comprises a carrier or backing foil material, with a metal coating or layer disposed thereon and covering the backing foil only over certain portion or portions thereof. The metal coating may be for example for decorative or informative purposes. On its side or face which is towards the coating of metal thereon, the backing foil may optionally be provided with a continuous, that is to say, uninterrupted, coating of covering lacquer, and/or the side or face of the metal coating that is remote from the backing foil may bear a layer of protective lacquer or an adhesive layer thereon. Disposed only in the region of the metal coating on the backing foil, between the metal coating and the backing foil itself or the coating of cover lacquer which is optionally provided thereon, is a layer of lacquer which comprises a lacquer that is hardened by means of a hardener which is applied only in the area covered by the metal coating, the lacquer, without the addition of the hardener, being soluble by a solvent which does not attack the backing foil and the optional further lacquer thereon. The layer of lacquer which is hardened by the selective application of hardener thereto may be formed by a transparent lacquer, preferably a transparently coloured lacquer.

It will be seen therefore that, in contrast to the hot-process embossing foils or other similar foils produced by the previous methods discussed above, wherein the coating of metal is removed in specific regions thereof by dissolving away the 'underlying' layer, the foil according to the present invention provides that between the metal coating and the backing or carrier foil is a further layer of lacquer which is insoluble and which is provided only in the areas in which the coating of metal is to be provided on the foil. That layer of lacquer is rendered insoluble by the addition of a hardener in the areas in which the metal coating is to be formed, whereas in the other regions the lacquer can be dissolved away.

With a foil of that nature, it is now possible for the underlying or base surface for carrying the metal coating to be made virtually flat and regular. On the other hand, the layer of lacquer which is applied underneath the metal coating and which is rendered selectively hard by the addition of a hardener at the appropriate areas can be readily formed by a transparent lacquer, which may possibly have a colouration effect, thereby ensuring that the coloured lacquer occurs only in the region of the metal coating portions on the foil, so that there is no fear of the background also being coloured. That therefore provides a foil giving further options in regard to the configuration thereof, in comparison with the foils produced by the previous methods as discussed above.

The foil in accordance with the principles of the present invention is advantageously produced by means of a method wherein the backing foil, or a layer of lacquer covering same if optionally provided, has a layer of lacquer applied thereto over its entire surface, the lacquer being such that it can be dissolved by means of a solvent which does not attack the backing foil or the optional layer of lacquer thereon, but can be hardened by the addition of a hardening agent which reacts with that lacquer to render it insoluble with respect to the above-mentioned solvent. When the layer of lacquer has been applied, hardening agent is thus applied to the regions of the layer of lacquer which are subsequently to be coated with metal, the hardening agent being applied for example by a printing-type process. The hardening agent reacts with the lacquer and renders it insoluble with respect to the solvent. A layer of metal is then applied over the full surface of the foil, and the appropriate portions of the metal coating are then removed by dissolving the underlying layer in the regions thereof to which a hardening agent has not been applied, by application of the solvent.

Thus, in the method in accordance with this invention, the soluble lacquer is applied not just in the areas in which the metal coating is to be subsequently removed, but instead it is applied to the backing foil over the entire surface thereof, with the hardening agent then being applied to the appropriate regions thereof to cause the lacquer to harden at those locations. It will be seen therefore that the hardening agent can be applied to the soluble lacquer in a layer of relatively small thickness, and it then reacts with the lacquer by penetrating thereinto, giving a further reduction in the thickness of the applied layer. That mode of procedure therefore gives a virtually flat surface which is particularly suitable for the subsequent operation of applying the coating of metal thereto, for example by a vapour deposit process. The solvent, when applied, can readily attack the layer of soluble lacquer in the areas thereof which have not been hardened by the selective application of the hardening agent, and can thus rapidly dissolve the lacquer thereby to cause elimination of the coating of metal thereover.

The hardening agent used may be taken from a very wide range of products. For example, the hardening agent employed could be a relatively viscous agent which essentially comprises only a hardener for the lacquer. In practice however it has been found that it may be desirable for the hardening agent to comprise a hardening or setting lacquer which corresponds in its basic composition to the lacquer which is to be hardened thereby and which contains a hardener in excess. Such a lacquer as the hardening agent can be applied by a printing operation in a particularly clean and neat manner. The hardener which is present in excess in the hardening lacquer then migrates out of that lacquer into the lacquer which is to be hardened thereby and causes hardening thereof, in which respect it will be appreciated that the surface of the lacquer to be hardened enjoys particular stabilisation by virtue of the hardening lacquer and thus forms a very good surface for the coating of metal to be applied thereto.

The soluble and hardenable lacquer and/or the above-mentioned hardening lacquer may be a transparent lacquer which is preferably a transparently coloured lacquer. That readily permits colouration effects to be produced in respect of the metal coating. Where the above-mentioned lacquer is not coloured, it is possible to form an additional coating of protective lacquer which does not adversely affect the brilliance of the metal coating.

In accordance with a further aspect of the teachings of this invention, in order to permit the soluble lacquer to be dissolved away, thereby to remove the selected portions of the metal coating, in a weakly alkaline, aqueous liquid, being therefore an innocuous liquid, the soluble and hardenable layer is formed by a lacquer containing a carboxyl group-bearing binding agent, preferably at least one carboxyl group-bearing acrylate, in ammoniacal solution or in solution containing volatile amines. Such lacquers may be readily dissolved by slightly alkaline aqueous liquids. When the lacquer used contains a carboxyl group-bearing binding agent, the hardening lacquer employed in accordance with the present invention is preferably a lacquer containing a polyfunctional aziridine. Such a lacquer is quick and reliable in its reaction with the lacquer to be selectively hardened, even when the layer of hardening lacquer applied is comparatively thin.

In a practical situation, it is generally sufficient for the thickness of the layer of the soluble and hardenable lacquer applied to be from 0.7 μm to 4 μm, while the thickness of the hardening lacquer may be from 0.5 μm to 3 μm. The thicknesses of the layers used may vary substantially, depending on the lacquer employed.

Further objects, features and details of the foil and method of manufacture thereof in accordance with the present invention will be apparent from the following description and the accompanying drawing.

DESCRIPTION OF THE PREFERRED EMBODIMENT

Figure 1:
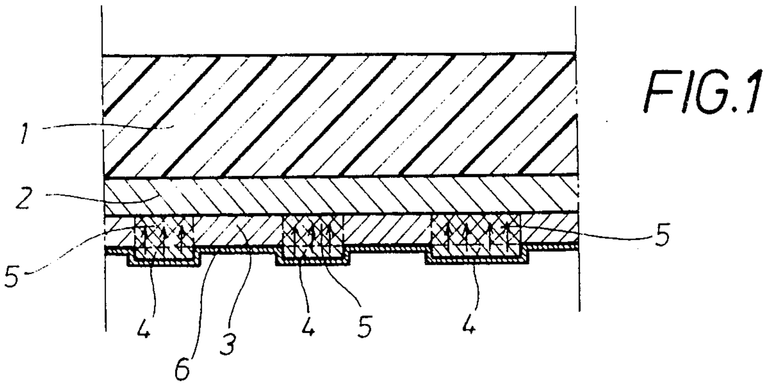
FIG. 1 shows a view in cross-section of a foil in accordance with the present invention, in its condition directly after a metal coating has been applied thereto.

Referring now to the drawing, as shown therein a foil such as a hot embossing foil in accordance with the present invention comprises a backing or carrier foil as indicated at 1, which is formed for example by a polyester film, being about 20 μm in thickness. Provided on the face of the backing foil 1 that is directed downwardly in the respective Figures of drawings is a layer or coating 2 of protective or release lacquer, being of the usual thickness for such a layer and being for example from 1 to about 10 μm, depending on the circumstances of use of the material. The layer 2 is intended to permit the hot embossing foil material to be easily separated from the backing foil, 1, but at the same time it should not have an adverse effect on the appearance of the foil, that is to say, it is preferably transparent.

A layer of lacquer as indicated at 3 is then applied to the surface of the layer 2 that is remote from the backing foil 1, with the thickness of the layer 3 being for example from about 0.7 to 4 μm. The layer of lacquer 3 is usually transparent and may be coloured with transparent colouring agents for example metal complex dyestuffs. The layer of lacquer 3 is soluble by means of a solvent which however does not attack the backing foil 1 and the layer of lacquer 2. For example, the lacquer of the layer 3 may contain a carboxyl group-bearing binding agent in ammoniacal solution or in a solution containing volatile amines, preferably a carboxyl group-bearing acrylate. For example, the lacquer forming the layer 3 could contain a carboxyl group-bearing acrylate in an ammoniacal solution in a proportion of 20 to 50%.

In the areas in which a coating of metal is to be formed on the foil material, a hardening agent which is indicated at 4 is applied to the surface of the layer of lacquer 3. The hardening agent 4 is such as to render the layer of lacquer 3 insoluble with respect to the above-mentioned solvent, in the areas in which the hardening agent 4 is applied to the layer of lacquer 3, and is for example preferably a hardening or setting layer and may be applied by a printing operation. The layer of lacquer 4, as an essential constituent, contains a hardener which is capable of causing cross-linking of the polymer contained in the layer of lacquer 3, for example by reacting with the functional groups which are contained therein. The above-indicated reaction, in one embodiment of the present invention, can be achieved by the lacquer forming the layer 4 containing a polyfunctional aziridine, in a concentration of from 2 to 10%.

The lacquer constituting the layer 4 may possibly also be transparently coloured by means of a transparent colouring agent such as a metal complex dyestuff.

After the layer of hardening agent 4 has been applied to the layer of lacquer 3 as by a printing process, the hardener penetrates out of the lacquer 4 into the layer of lacquer 3 in the regions 5 (such penetration being indicated by the arrows in FIG. 1), so that the regions 5 of the layer of lacquer 3 undergo cross-linking of the lacquer, that is to say, the lacquer is caused to set and harden, whereby it is no longer open to attack by the above-mentioned solvent. The layer 3 therefore comprises areas or islands of lacquer which are insoluble with respect to the solvent used, and between such areas or islands, portions of lacquer which have still remained soluble by the solvent.

The foil which has thus been provided with the layer of lacquer 3 and the selectively applied hardening agent 4 is then provided over its entire surface, being the surface which faces downwardly in the drawings, with a metal layer or coating which is indicated at 6, for example a layer of aluminium which is applied by a vacuum deposit process. That therefore results in the configuration and structure shown in FIG. 1, with the metal coating 6 on the hardened portions or islands of the layer of lacquer 3 standing slightly proud of the interposed regions under which the lacquer 3 is still soluble.

After the above-described set of operations, which constitute the first step in the method of manufacture of the composite foil material, has been concluded, and after the clapse of a period of time which is sufficient for cross-linking of the lacquer 3 to occur in the regions 5, the regions of the layer of lacquer 3 which have not been caused to harden by the penetration thereinto of hardener from the hardening agent 4, between the hardened regions 5, together with the metal coating 6 thereon, are removed or washed away by means of a suitable solvent, as referred to above, which is thus capable of dissolving away the portions of layer of lacquer 3 between the hardened regions 5. The material is then rinsed to remove residual solvent, and dried. When the lacquer constituting the layer 3 is of a composition as indicated hereinbefore, the operation of removing the areas of the layer 3 that have to be eliminated between the hardened regions 5 is effected by means of a weakly alkaline aqueous liquid which acts on the carboxyl groups in the binding agent to dissolve away the layer of lacquer 3.

Figure 2:
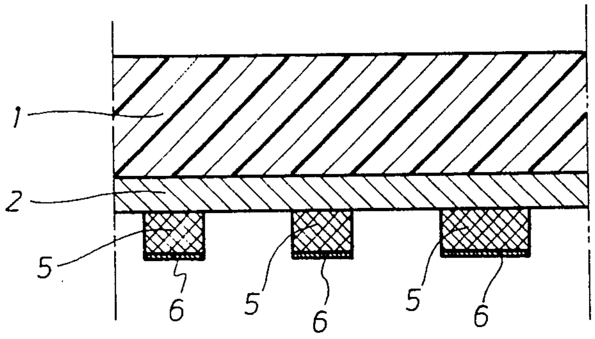
FIG. 2 shows a corresponding sectional view of the FIG. 1 foil after the metal coating has been removed in selected regions thereof.

At the termination of the dissolution and washing operations just described, which constitute the second step in the method, the result is a structure as illustrated in FIG. 2, in which the metal layer 6 is present only in portions on the regions 5 of the layer of lacquer 3 where that lacquer had been hardened by the addition of hardening agent.

Figure 3:
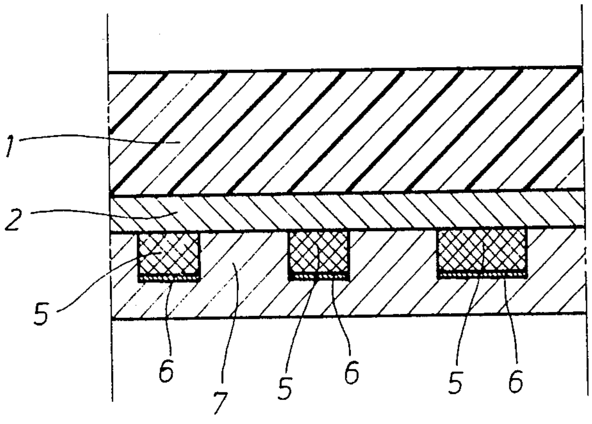
FIG. 3 shows a corresponding sectional view of the finished hot embossing foil which is provided with an adhesive coating thereon.

The material shown in FIG. 2 is then finally completed to produce a finished embossing foil (see FIG. 3), for example a layer 7 is applied in known manner and in known form to constitute for example a background layer to the embossing foil, or an adhesive layer, or a protective layer.

Set out below are examples in respect of lacquers which can be used for manufacturing the foil according to the invention, as illustrated in the embodiment described above:

Cover lacquer 2:

| Components | Parts by weight |
|---|---|
| Methylmethacrylate copolymer (melting point: 190–200° C. by the 'ring and ball' method) | 1000 |
| Methylethylketone | 1600 |
| Toluene | 4000 |
| Diacetonealcohol | 8000 |

Layer of lacquer 3:

This lacquer is a water-soluble lacquer which is normally made weakly alkaline by ammonia or amines.

| Components | Parts by weight |
|---|---|
| Carboxyl group-bearing acrylate (emulsion pH = 5), 40% solids | 2000 |
| Ethylalcohol | 2000 |
| Ammonia solution (7% $NH_3$) | 200 |

Hardening lacquer 4:

This is a transparent, coloured lacquer.

| Components | Parts by weight |
|---|---|
| Polyfunctional aziridine (liquid, specific weight 1.08 g/cm$^3$ at 25° C.) | 300 |
| Carboxyl group-bearing acrylate (as the lacquer of layer 3) | 2000 |
| Ethylalcohol | 2000 |
| Metal complex dyestuff solution | 100 |

It will be appreciated that the teachings of the present invention may be followed not only in producing hot embossing foils but quite generally also in the production of foils which bear metal thereon in one or more regions thereof. In that case it is only necessary for the succession of layers and/or the lacquer composition to be varied, as required. It will be further appreciated that the invention is therefore in no way restricted to using the lacquers described hereinbefore, for example it would also be possible to use lacquers comprising natural resins.

What is claimed is:

1. A method of manufacturing a foil material including a backing foil and metal layer portions thereon, which comprises the steps of:

(a) coating a first surface of said backing foil with a layer of solvent-soluble material dissolvable by a solvent which does not attach said backing foil;

(b) applying selectively a hardening agent to said layer of solvent-soluble material to portions thereof to be covered by said metal layer portions to form preselectively hardened solvent-insoluble material layer portions and residual unhardened solvent-soluble material layer portions;

(c) applying a layer of metal to said preselectively hardened solvent-insoluble material layer portions and residual unhardened solvent-soluble material layer portions; and (d) contacting the product of step (c) with said solvent to remove said residual unhardened solvent-soluble material and overlayed metal layer portions to form said foil material.

2. The method as set forth in claim 1 wherein said hardening agent is a hardening lacquer which corresponds in its basic composition to said layer of solvent-soluble material and containing excess hardener.

3. The method as set forth in claim 1 wherein said layer of solvent-soluble material is a transparent lacquer.

4. The method as set forth in claim 1 wherein said layer of solvent-soluble material is a transparently coloured lacquer.

5. The method as set forth in claim 2 wherein said hardening lacquer is a transparent lacquer.

6. The method as set forth in claim 2 wherein said hardening lacquer is a transparently coloured lacquer.

7. The method as set forth in claim 1 wherein said layer of solvent-soluble material comprises a lacquer containing a carboxyl group-bearing binding agent in an ammonical solution.

8. The method as set forth in claim 1 wherein said layer of solvent-soluble material comprises a lacquer containing a carboxyl group-bearing binding agent in solution containing at least one volatile amine.

9. The method as set forth in claim 1 wherein said layer of solvent-soluble material comprises at least one carboxyl group-bearing acrylate.

10. The method as set forth in claim 2 wherein said hardening agent comprises a lacquer containing a polyfunctional aziridine.

11. The method as set forth in claim 1 wherein a further layer of solvent-soluble material is applied to said foil material after step (a).

12. A foil material comprised of a backing foil having preselect metal layer portions, said foil material being manufactured by the steps of:

(a) applying a layer of protective material to a first surface of a backing foil;

(b) applying a layer of solvent-soluble lacquer to said layer of protective material;

(c) applying a pattern configuration of a hardening agent on said layer of solvent-soluble lacquer, said hardening agent causing hardening of said portions of said layer of solvent-soluble lacquer corresponding to said pattern configuration to render same solvent-insoluble;

(d) applying a coating of metal to said layer of solvent-soluble lacquer overlayed with said pattern configuration of said hardening agent after hardening of said portions of said layer of solvent-soluble lacquer corresponding to said pattern configuration; and (e) contacting said coating of metal with said solvent to dissolve portions of said layer of solvent-soluble lacquer not contacted by said hardening agent and thereby also to remove portions of metal applied thereon, said layer of protective material not being attacked by said solvent and facilitating separation of said preselect metal layer portions from said backing foil.

* * * * *